United States Patent [19]

Nagai et al.

[11] Patent Number: 5,008,842
[45] Date of Patent: Apr. 16, 1991

[54] METHOD OF SEQUENTIAL MONITORING AND APPARATUS FOR PRACTICING THE SAME

[75] Inventors: Tetsuji Nagai; Katura Torii; Yoshio Ohno, all of Kanagawa, Japan

[73] Assignee: Fuji Photo Film Co., Ltd., Kanagawa, Japan

[21] Appl. No.: 260,012

[22] Filed: Oct. 19, 1988

[30] Foreign Application Priority Data

Oct. 19, 1987 [JP] Japan .................... 62-263236

[51] Int. Cl.⁵ .................................... G06F 15/46
[52] U.S. Cl. .................... 364/551.01; 364/474.16; 364/550; 364/551.02; 364/552
[58] Field of Search ............... 66/132 T, 163; 364/474.11, 474.16, 474.17, 474.19, 550, 551.01, 551.02, 552

[56] References Cited

U.S. PATENT DOCUMENTS

| | | | |
|---|---|---|---|
| 4,176,396 | 11/1979 | Howatt | 364/551.02 |
| 4,346,446 | 8/1982 | Erbstein et al. | 364/551.01 |
| 4,532,599 | 7/1985 | Smith | 364/552 |
| 4,551,813 | 11/1985 | Sanbayashi et al. | 364/569 |
| 4,581,711 | 4/1986 | Hirata et al. | 364/550 |
| 4,623,967 | 11/1986 | Naimer | 364/483 |
| 4,628,710 | 12/1986 | Jacobsson | 66/132 T |
| 4,758,964 | 7/1988 | Bittner et al. | 364/550 X |
| 4,947,349 | 8/1990 | Munenaga et al. | 364/551.01 |

FOREIGN PATENT DOCUMENTS

| | | |
|---|---|---|
| 0004907 | 10/1979 | European Pat. Off. |
| 2100600 | 3/1972 | France |
| 2544099 | 10/1984 | France |
| 59-62912 | 4/1984 | Japan |
| 2067307 | 7/1981 | United Kingdom |
| WO86/04432 | 7/1986 | World Int. Prop. O. |

OTHER PUBLICATIONS 60-112107 Jp. "Device Verifying Operation of Equipment", Patent Abstract of Japan, vol. 9, No. 62, p. 393, Oct. 1985.

Primary Examiner—Parshotam S. Lall
Assistant Examiner—Edward R. Cosimano
Attorney, Agent, or Firm—Young & Thompson

[57] ABSTRACT

A production line has a plurality of working groups in which work operations are controlled by a sequential controller. Detectors are provided in each working group of the production line to output signals to a microcomputer. The microcomputer makes sequence patterns for each working group based on data comprised by the signals from the detectors with respect to the order of outputting and the time intervals of the signals. During monitoring, the microcomputer compares signals from the detectors with the corresponding sequence pattern for each working group to monitor the working conditions of the working groups.

15 Claims, 3 Drawing Sheets

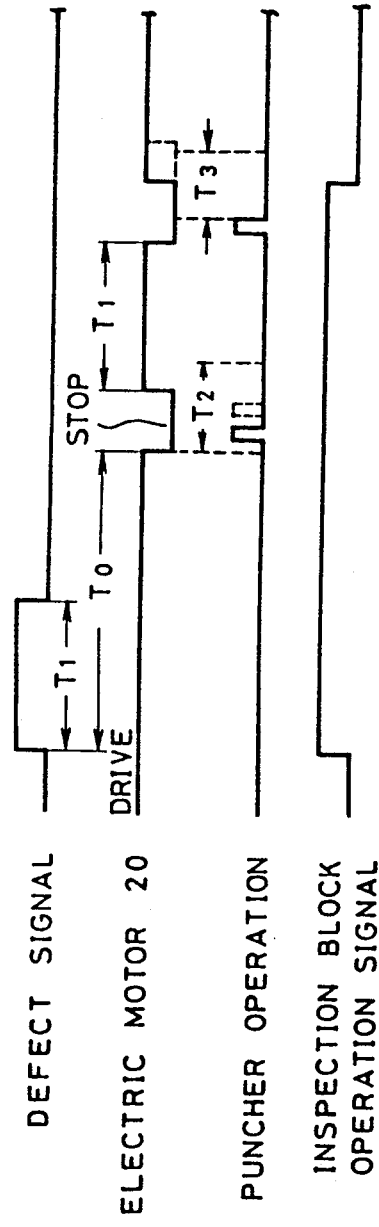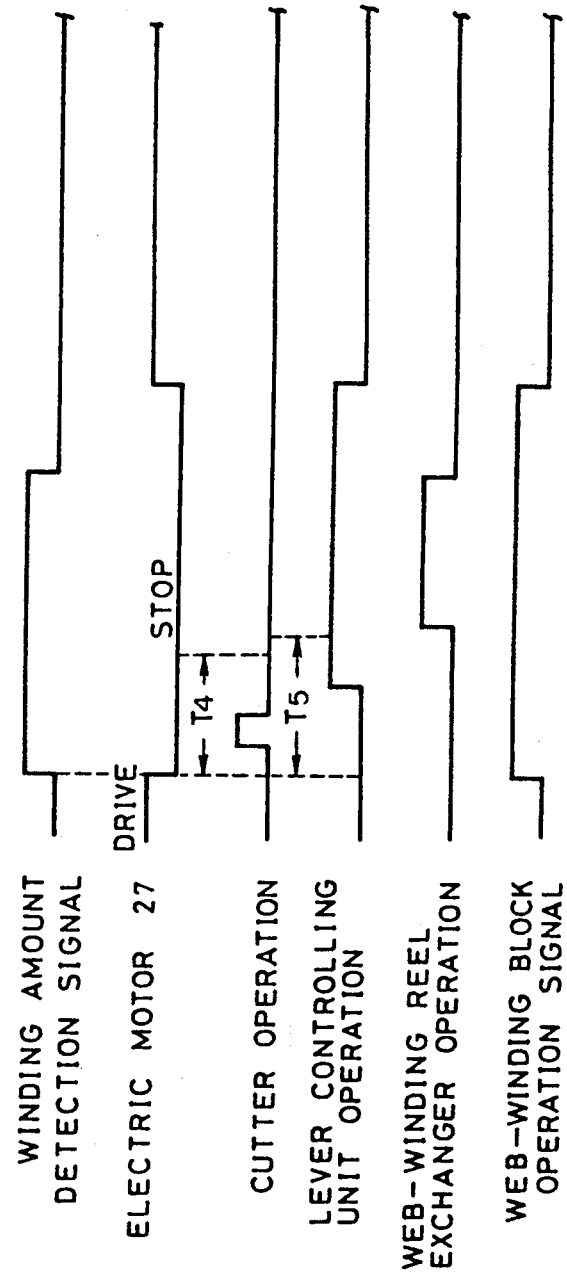

METHOD OF SEQUENTIAL MONITORING AND APPARATUS FOR PRACTICING THE SAME

BACKGROUND OF THE INVENTION

1. Field of the Invention

The present invention relates to a sequential monitoring method and apparatus for monitoring the working state of a production line.

2. Prior Art

Automated production facilities usually include production lines along which products or partially-fabricated products to be processed are transported by belt conveyors or the like and on which products various work operations are performed according to predetermined sequences. If an abnormal condition of transporting or work operation occurs on a production line, the operation of the line is quickly stopped to avoid escalation into more serious trouble.

For monitoring the working state of a production line, detectors such as microswitches are provided along the production line and the electrical outputs of the detectors are fed to a sequence diagnostic apparatus as disclosed in, for example, Japanese Patent Kokai No. 59-62912. The sequence diagnostic apparatus evaluates the state of the production line based on the timing of the outputs of the detectors and generates triggering signals such as an emergency signal upon detecting an abnormal state. On the production line, if the triggering signals are output to stop the operation of the production line, the apparatus reads out the data stored in the memories, for making an analysis of the cause of the abnormal state. The data on the progress of the work is printed out on data sheets in a predetermined format.

In the conventional sequence monitoring method, as reference data used for judgment of an abnormal state are previously input in the sequence diagnostic apparatus, the work involved in inputting the data and calculating from the reference data is burdensome. Furthermore, when the material, kind, or size of the products or partially fabricated products to be processed is changed, the sequence of the product line accordingly changes and new data should be input into the sequence diagnostic apparatus, which limits its practical uses. Since the triggering signals are output only in the case of an abnormal state of the production line, which line must then be stopped, the stage at which the line gradually assumes an abnormal state cannot be detected. That is, the conventional method and its system cannot prevent abnormal states. Still further, since the sequence diagnostic apparatus outputs all of the data, it takes a longer time to analyze the data on the abnormal state, and especially to identify the work as to which the problem arose.

OBJECTS OF THE INVENTION

It is therefore an object of the present invention to provide a method and apparatus for the sequential monitoring of the working state of a production line which makes it possible to know the stage at which the production line is gradually changing toward an abnormal state before the production line actually reaches that abnormal state.

It is another object of the present invention to provide a method and apparatus for the sequential monitoring of the working state of a production line which can be widely used in a variety of manufacturing operations.

SUMMARY OF THE INVENTION

For achieving the above and other objects and advantages, a method for the sequential monitoring of a production line according to the present invention comprises storing first data comprised by the order of outputting and the time intervals of electrical signals generated by detectors provided in particular work operation groups each of which includes a plurality of work operations, making a sequence pattern based on said first stored data, and monitoring the working states of the particular work operation groups by comparing said sequence pattern with said electrical signals.

Furthermore, apparatus for the sequential monitoring of a production line including work operation groups comprises detectors provided in particular work operation groups each including a plurality of work operations, so as to output a plurality of kinds of electrical signals representing each work operation, and means for making a sequence pattern based on said electrical signals and for monitoring the working states of the work operation groups by comparing said sequence pattern with said electrical signals.

According to the present invention, the sequential work operations of each group are monitored for compliance with a sequential pattern for the group having the same working pattern for each working cycle. When an abnormal operation occurs in the production line, it is thus easy to find which working group is in trouble. Moreover, the monitoring can be performed independently of the sequential control of the sequential controller of the production line, thereby confirming that the operation is normal.

BRIEF DESCRIPTION OF THE DRAWINGS

The above objects and features of the invention will become more apparent by reference to the following description, taken in connection with the accompanying drawings, in which:

FIG. 3 is a time chart which illustrates the operation of an inspection block of FIG. 1; and FIG. 4 is a time chart which illustrates the operation of a web-winding block of FIG. 1.

DETAILED DESCRIPTION OF THE INVENTION

Figure 1:
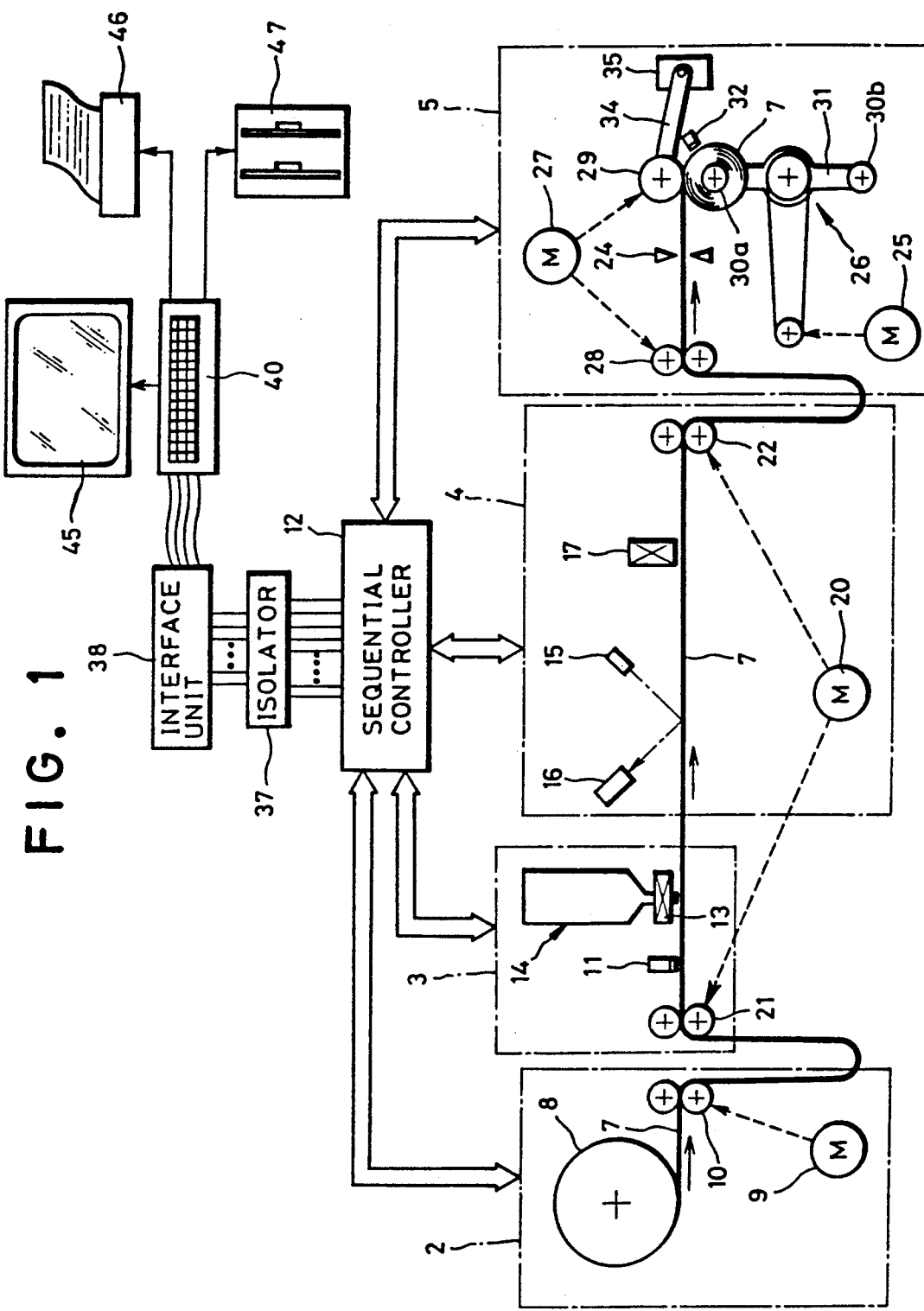
FIG. 1 is a schematic block diagram of an embodiment of a production line provided with sequential monitoring according to the present invention.

Referring to FIG. 1 showing an embodiment of a production line provided with sequential monitoring according to the present invention, a web 7 is transported at a constant speed while being coated with emulsion on its surface. The thickness of the emulsion layer is inspected with a detector and thereafter the web is wound around a reel 30a or 30b. The production line has work operation groups: web-supplying group 2; emulsion-applying group 3; inspection group 4; and web-winding group 5. In each group, web 7 is subjected to a work operation or to work operations.

In the web-supplying group 2, the web 7 is drawn from a supply reel 8 for transport to the emulsion-applying group 3, by a pair of supply rollers 10. The supply rollers 10 are driven by a motor 9 which is controlled at a constant running speed by operation signals fed from a sequential controller 12.

Provided in the emulsion-applying group 3 is a line sensor 11 which optically detects the presence of the web 7 and measures its width. There is also an applicator 14 having a nozzle 13 which applies emulsion to the moving web 7 to form an emulsion layer on the surface of the web 7 of a predetermined thickness. The applicator 14 has a solenoid valve and so forth for this application and is adapted to change the width of the layer of emulsion on the web 7.

The inspection group 4 is provided with a light-emitting unit 15, a light-receiving unit 16, a puncher 17, and a pair of driving rollers 22. The light-emitting unit 15 projects a laser beam onto the surface of the running web 7 with the beam scanning in the transverse direction of web 7. The frequency of the laser is selected so as to have no influence on the emulsion. The light-receiving unit 16 comprises light-receiving elements which are arranged in a row parallel to the transverse direction of the web 7 to receive part of the laser beam reflected from the surface of the web 7. The light-receiving unit 16 sends signals representing the received light intensity. If the emulsion is unevenly applied on the web 7, the sequential controller 12 finds the area of the unevenly applied emulsion layer based on the signals from the light-receiving unit 16 and sends command signals to a puncher 17. The puncher 17 punches holes in the web 7 at the beginning and end of the unevenly applied area. The punched unevenly applied area of the web 7 is cut off at another processing station for the web 7. In the emulsion-applying and inspection groups 3 and 4, the driving rollers 21, 22 driven by a common motor 20 feed the web 7 at the same constant speed as the feeding speed of the rollers 10.

The web-winding group 5 includes a cutter 24, a pair of rollers 28 driven by a motor 27, a nip roller 29 also driven by motor 27, web-winding reels 30a, 30b (in FIG. 1, the web 7 is being wound around the reel 30a), and a reel changer 26 including a motor 25. The reel changer 26 is provided with a reel holding lever 31 turnably holding the reels 30a and 30b, and a detector 32 for measuring the amount of the web 7 wound around the reel 30a or 30b. When the amount of the wound web 7 reaches a predetermined value, the detector 32 outputs electrical signals by detecting the position of the surface of the outermost convolution of the wound web 7. A lever 34 holding the nip roller 29 turns under the control of a lever controlling unit 35, for example, having a solenoid. In FIG. 1, the nip roller 29 is in nipping position to press the web 7 toward the shaft of the reel 30a. Because the nip roller 29 is also driven by the motor 27, the reel 30a rotates clockwise, winding the web 7 around its shaft. When the lever controlling unit 35 operates under the instructions from the sequential controller 12, the lever swings clockwise to move the nip roller 29 away from the surface of the web 7 to the unloading position.

Figure 2:
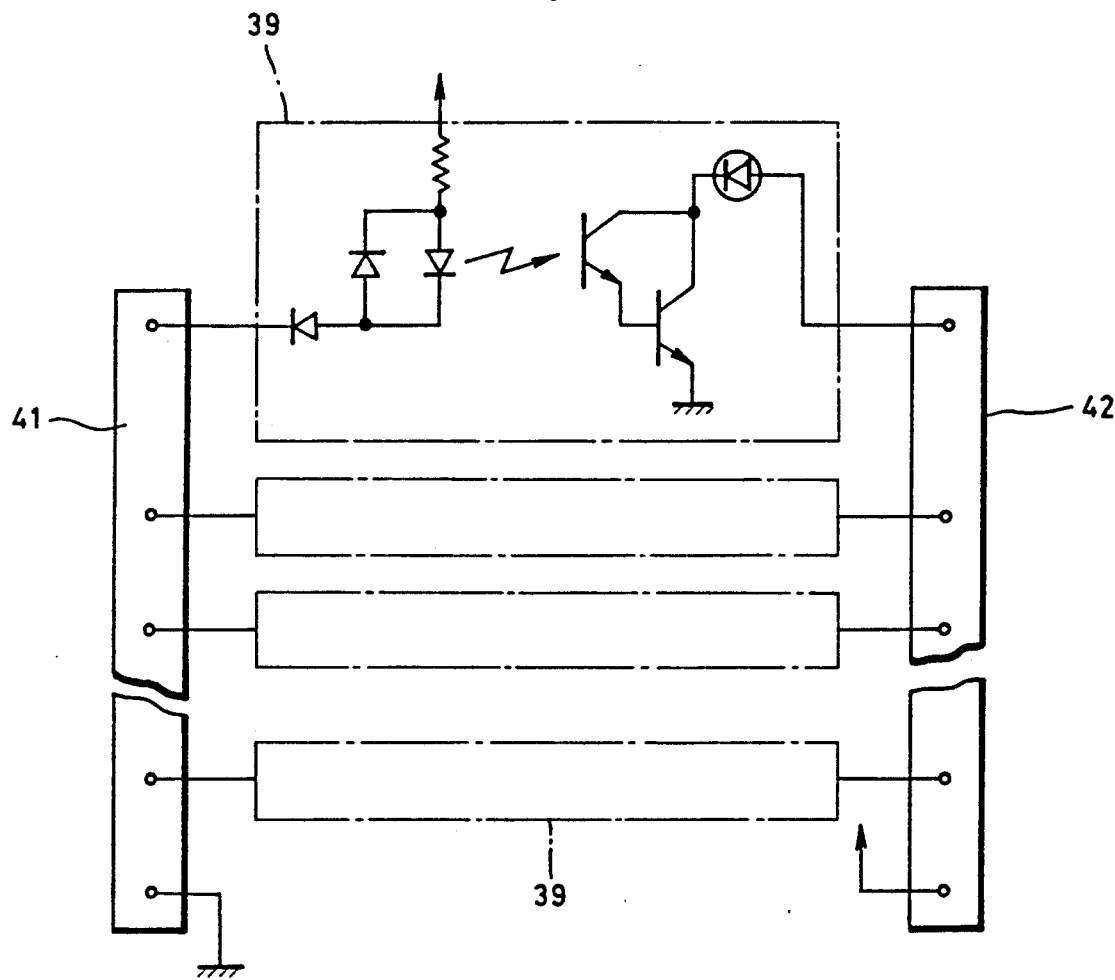
FIG. 2 is a schematic diagram of an isolator used in the embodiment of FIG. 1.

The sequential controller 12, as described above, sends command signals to the web-supplying group 2, the emulsion-applying group 3, inspection group 4, and web-winding group 5 and receives signals from the groups 2, 3, 4 and 5. A microcomputer 40 is connected with the sequential controller 12 through an isolator 37 and an interface unit 38. The isolator 37 is a signal transmission unit comprising, for example, a photocoupler 39 as shown in FIG. 2 and is connected between two terminal boards: a terminal board 41 of the sequential controller 12, and a terminal board 42 of the interface unit 38.

To the microcomputer 40 are connected a CRT 45 and a printer 46 as output units, and a floppy disk drive unit 47 (which is hereinafter referred to as FD 47) as an auxiliary memory. The microcomputer 40 electrically scans the states of the signals from the working groups so as to monitor the changes of the states of the signals. For increasing the processing and scanning speeds, a timer board may be provided in the microcomputer 40, or the program may be described in an assembly language, particularly any part of the program for which higher speeds of processing are necessary. The description of other detectors such as microswitches which generate signals is omitted.

Next, the operation of the illustrated embodiment will be described in detail. When the production line starts to operate, the motors 9, 20 and 27 in the groups are driven for transporting the web 7. The web 7 is firstly drawn from the web supplying reel 8 in the web-supplying group 2 and transported to the emulsion applying group 3. The line sensor 11 detects the leading end of the web 7 and measures its width to output electrical signals representing the detection and width to the sequential controller 12. Corresponding to the reception of the signals, the sequential controller 12 feeds control signals to the applicator 14 for setting the width of emulsion application according to the size of the web 7, and for opening the nozzle 13 when the leading end of the web 7 reaches the position just under the nozzle 13. In this way, on the surface of the web 7, an emulsion layer having a constant width and a constant thickness is provided. In the inspection group 4, the applied web 7 is checked for any unevenly coated areas with the light-emitting and -receiving units 15, 16. If an unevenly coated area is detected, the output of the light-receiving unit 16 increases in value over the predetermined threshold level. The change is digitally converted to binary coded signals to produce a defect signal as shown in FIG. 3. The leading edge of the defect signal corresponds to the beginning of the unevenly coated area and the trailing edge, to the end thereof.

When the sequential controller 12 receives such a defect signal, the controller 12 stops the motor 20 after a predetermined time $T_0$ based on the speed of the web 7, as shown in FIG. 3. The beginning of the unevenly coated area is accordingly placed just under the puncher 17.

Upon receiving a punching-end signal from the puncher 17, the sequential controller 12 again drives the motor 20. After a time $T_1$ corresponding to the duration of the defect signal from the moment of the start of the redriving of the motor 20, the sequential controller 12 again stops the motor 20. Then the puncher 17 makes a hole at the end of the unevenly coated area. After this punching, the normal movement of the web 7 is started again.

After passing through the inspection group 4, the web 7 is lastly transported to the web-winding group 5 to be wound around the web-winding reel 30a. When the detector 32 detects that the amount of the wound web 7 reaches the predetermined value of a full reel, the detector 32 outputs a winding amount detection signal shown in FIG. 4 to the sequential controller 12. Corresponding to the reception of the signal, the sequential controller 12 starts a reel-changing operation. That is, the controller 12 outputs a signal which stops the motor 27. After the stoppage of the motor 27, the cutter 24 cuts the web 7. When the sequential controller 12 receives the cutting-end signal from the cutter 24, the controller 12 operates the lever controlling unit 35 to swing the lever 34 clockwise by a predetermined angle, moving the nip roller 29 to the unloading position. After the sequential controller 12 confirms the operation of the lever controlling unit 35, namely, the movement of the nip roller 29 to the unloading position, the sequential controller 12 outputs an operation signal to the reel changer 26. Upon receipt of this signal, the motor 25 rotates a predetermined amount. In this way, the reel 30a with the predetermined full amount of the web 7 is removed from the winding position and new web-winding reel 30b without web wound around its shaft comes into the winding position.

When the sequential controller 12 receives the setting-end signal from the lever controlling unit 35 at the end of the setting of the new reel 30b, the controller 12 sends an operation-stop signal to the lever controlling unit 35 to press the nip roller toward the shaft of the reel 30b.

The web 7 is now wound around the new reel 30b. The reel-changing operation of the web-winding group 5 is completed at the moment of restarting the motor 27. The web-winding reel 30a, which has a fully wound web 7, is taken off the reel-holding lever 31 and a new empty reel is set in its place.

In the production line described above, since there is no mutual relationship between the groups, there is no sequential control of the sequential controller 12 between the groups, for example, between the emulsion-applying group 3 and the inspection or web winding group 4 or 5, and between the inspection group 4 and the web-winding group 5. In order to check for normal operation of the production line, the signals are sent through the isolator 37 and the interface unit 38 to the microcomputer 40. The microcomputer 40 monitors the timing of the signals which are sent or received between the working groups and the sequential controller 12, thus judging the working state of each working group of the production line. This monitoring can be separately performed for each group.

The data used for judging whether the sequential operations of the group are normal or not are automatically sampled by the microcomputer 40 through the sequence controller 12. For example, while the inspection group operation signal (FIG. 3) is fed to the inspection group 4, the order of the outputtings and time intervals of the signals shown in FIG. 3 from the inspection group 4 are stored in the memories incorporated in the microcomputer 40.

This sampling of the signals is performed according to a data sampling program stored in the microcomputer 40. The signals of, for example, the sequential operations of the inspection group 4 are sampled ten times each time the inspection group 4 operates and are written in the address areas. After this sampling, the average values of the time intervals are calculated: the time from the moment of the outputting of the defect signal to the moment of the stoppage of the motor 20; the time from the stoppage of the motor 20 to the start of the operation of the puncher 17; and the time from the start of the operation of the puncher 27 to the restart of the motor 20. The calculated average values are stored as the reference time intervals. Values of the reference deviations are also calculated from the values of the standard deviations of the time intervals obtained by sampling and stored in the memories of the microcomputer 40. In the illustrated embodiment, after the third sampling, the monitoring of the sequential operation is carried out simultaneously with the sampling. The order of the signals may be determined based on the first sampling.

After storing the order, reference time, and reference deviations of the sequential operations in the inspection group 4 as a sequence pattern, the data of the inspection group 4 in operation are compared with the stored sequence pattern. In the same way, the sequence pattern for the web-winding group 5 is automatically made by the microcomputer 40.

In FIG. 3, the sequence pattern for the inspection group 4 is illustrated by solid lines if an unevenly coated area is detected. $T_2$ shows the average time interval, as an allowable reference deviation, from the stoppage of the motor 20 to the start of the puncher 17. Even if the puncher starts to operate as shown by broken lines, the timing of the start is judged to be normal. $T_3$ shows the allowable time interval from the end of the puncher operation to the restart of the driving of motor 20. If the motor 20 restarts at the timing shown by broken lines after the puncher 17 has made a hole at the end of the unevenly coated area, the work is judged to be abnormal.

The microcomputer 40 has various working modes: an emergency monitoring mode; an order monitoring mode; an interval monitoring mode; an order and interval monitoring mode; and a printing mode. Therefore, corresponding to the features and characteristics of the operations of each working group, the microcomputer 40 can monitor each working group simultaneously in a particular monitoring mode.

In the emergency monitoring mode, a block is monitored as to whether a seriously abnormal working state will occur. An example of such a seriously abnormal state is that the motor 20 will not stop even though a defect signal is output from the inspection group 4. Another is that the puncher 17 starts to operate before the motor 20 stops. If such a seriously abnormal state occurs, all operations of the working groups are immediately stopped and all of the data of the signals from the groups for one minute (this time is changeable) before and after the occurrence of the abnormal state are printed out with the printer 46, for analysis.

In the order monitoring mode, a group is monitored with respect to the order of the outputting of the signals sequentially output from the sequential controller 12. As for, for example, the operation of the web-winding group 5, the order of the operation is: (1) detection of the amount of the web 7 wound around the reel 30a or 30b; (2) stoppage of the motor 27; (3) operation of the cutter 24; (4) operation of the lever controlling unit 35.

In the interval monitoring mode, for example, it is monitored whether the operations of the cutter 24 and the lever controlling unit 35 start within the respective reference times $T_4$, $T_5$. When the actual time exceeds the reference time, the microcomputer judges that the operations are not normal. In this mode, the order of the operations of the cutter 24 and the lever controlling unit 35 are of no consequence.

In the order and interval monitoring mode, the order and the time intervals, for example, of the operations of the cutter 24 and the lever controlling unit 35 are monitored.

In the printing mode, various kinds of signal data are printed out by the printer 46. For example, the signals themselves, and the times and kinds thereof, are output when the levels of the signals change. Thus are printed out the names of the groups and work operations thereof. For monitoring the signals, the printing mode may be also set even though there are no abnormal working conditions. Therefore, before serious trouble occurs, the premonitory signs can be detected. If such premonitory signs are found, the production line is manually stopped for inspection. The premonitory signs may be automatically detected and in this case, the production line may be also automatically stopped.

When an abnormal condition is detected in any monitoring mode of the microcomputer 40, the data, that is, the kind of abnormality (order or interval), the name of the abnormal group, and so forth are displayed on the CRT 45 and are printed out by the printer 46. Furthermore, the data are written on a floppy disk in the FD 47 for future analysis of the abnormal condition. The data before and after the occurrence of the abnormality may be included.

It should be noted that the monitoring mode can be selected freely for each working group or that one mode can be used for all working groups.

In this embodiment, although the signals from the groups are sent to the microcomputer 40 through the sequence controller 12, the signals may be directly fed to the microcomputer 40.

It is further to be understood that the form of the invention herein shown and described is to be taken as a preferred example of the same and that various changes in the shape, size and arrangement of parts may be resorted to without departing from the spirit of the invention or the scope of the subjoined claims.

What is claimed is:

1. A method of sequential monitoring for monitoring a production line which includes working groups whose work operations are controlled by a sequential controller, comprising the steps of:
   receiving electrical signals from detectors, one of said detectors being provided in each of a plurality of working groups distributed along a said production line, each of said working groups performing a different plurality of work operations;
   storing first data generated from said received signals and representative of the order of outputting and the time intervals of said electrical signals;
   producing a sequence pattern based on said stored first data and representative of a sequence of work operations performed within at least one of said working groups as well as representative of a time interval within which each of said work operations has been performed a plurality of times; and
   monitoring the working conditions of said plurality of working groups by comparing said sequence pattern with said electrical signals received after producing said sequence pattern.

2. A method of sequential monitoring as claimed in claim 1, wherein said monitoring step includes judging whether said plurality of working groups are in an abnormal condition or a normal condition.

3. A method of sequential monitoring as claimed in claim 2, further including a step of stopping the operation of the production line when a working condition of one of said working groups is judged to be in an abnormal state.

4. A method of sequential monitoring as claimed in claim 1, further including the step of outputting second data derived from said electrical signals, by output units including a CRT and a printer.

5. A method of sequential monitoring as claimed in claim 4, wherein said second data include data on normal and abnormal conditions of said plurality of working groups and data representing which work operation is abnormal.

6. A method of sequential monitoring as claimed in claim 1, further including the step of storing second data derived from said electrical signals on a storing member including a floppy disk.

7. A method of sequential monitoring as claimed in claim 6, wherein said second data include data on normal and abnormal conditions of said plurality of working groups and data representing which work operation is abnormal.

8. Sequential monitoring apparatus for monitoring a production line including working groups, comprising:
   a detector provided in each of a plurality of working groups each of which groups includes a different plurality of work operations distributed along a said production line so as to output various kinds of electrical signals representing each work operation;
   means for producing a sequence pattern based on said electrical signals and representative of a sequence of work operations performed within at least one of said working groups as well as representative of a time interval within which each of said work operations has been performed a plurality of times; and
   means for monitoring the working conditions of the working groups by comparing said sequence pattern with said electrical signals generated after producing said sequence pattern.

9. Sequential monitoring apparatus for monitoring a production line including working groups, comprising:
   a detector provided in each of a plurality of working groups including a different plurality of work operations distributed along a said production line so as to output various kinds of electrical signals representing each work operation;
   means for producing a sequence pattern from the order of outputting and the time intervals of said electrical signals, said sequence pattern representing a sequence of work operations performed within at least one of said working groups as well as representative of a time interval within which each of said work operations has been performed a plurality of times;
   means for storing said sequence pattern; and
   means for monitoring the working conditions of said production line by comparing said stored sequence pattern with said electrical signals generated after producing said sequence pattern.

10. Sequential monitoring apparatus as claimed in claim 9, wherein said monitoring means stops all of the work operations of the working groups when a working condition is judged to be abnormal as a result of the monitoring.

11. Sequential monitoring apparatus as claimed in claim 9, wherein said monitoring means is a microcomputer.

12. Sequential monitoring apparatus as claimed in claim 11, wherein said microcomputer outputs data produced from said electrical signals to output means.

13. Sequential monitoring apparatus as claimed in claim 12, wherein said output means includes a CRT and a printer.

14. Sequential monitoring apparatus as claimed in claim 12, further including external storage means for storing said data.

15. Sequential monitoring apparatus as claimed in claim 14, wherein said external storage means is a floppy disk.

* * * * *